United States Patent [19]

Telymonde

[11] Patent Number: 6,002,743
[45] Date of Patent: Dec. 14, 1999

[54] METHOD AND APPARATUS FOR IMAGE ACQUISITION FROM A PLURALITY OF CAMERAS

[76] Inventor: Timothy D. Telymonde, 75 Manchester Ave., Keyport, N.J. 07735

[21] Appl. No.: 09/040,054

[22] Filed: Mar. 17, 1998

Related U.S. Application Data

[60] Provisional application No. 60/052,460, Jul. 14, 1997, and provisional application No. 60/021,904, Jul. 17, 1996.

[51] Int. Cl.[6] .................................................. H05G 1/64
[52] U.S. Cl. ............................... 378/98.8; 378/98.2
[58] Field of Search ........................ 378/98.8, 96, 97, 378/98.2, 108

[56] References Cited

U.S. PATENT DOCUMENTS

| | | | |
|---|---|---|---|
| 4,393,410 | 7/1983 | Ridge et al. | 358/285 |
| 4,730,212 | 3/1988 | Wojcik et al. | 358/83 |
| 5,138,167 | 8/1992 | Barnes | 250/370.01 |
| 5,309,496 | 5/1994 | Winsor | 378/98.2 |
| 5,396,418 | 3/1995 | Heuscher | 364/413.18 |
| 5,461,653 | 10/1995 | Parker | 378/22 |
| 5,493,595 | 2/1996 | Schoolman | 378/41 |
| 5,523,786 | 6/1996 | Parulski | 348/269 |
| 5,703,965 | 12/1997 | Fu et al. | 382/232 |

*Primary Examiner*—David P. Porta
*Assistant Examiner*—Michael J. Schwartz
*Attorney, Agent, or Firm*—Patrick J. Pinto

[57] ABSTRACT

An image acquisition system that uses multiple cameras or image sensors in a redundant camera array. The cameras or sensors are arrayed in rows and columns so that a viewing area of each camera overlaps a viewing area of an adjacent camera. At least one camera is positioned in the array so that all edges of its viewing area abuts the viewing area of an adjacent camera. The image is displayed or stored in seamless and continuous form in high resolution. The system may also be used in low light conditions for image acquisition. Multiple cameras or sensors may be arrayed on modular panels that mates with and adjacent modular panel. The system is adaptable to image acquisition for X-rays, scanning, photocopying, security systems and the like.

43 Claims, 5 Drawing Sheets

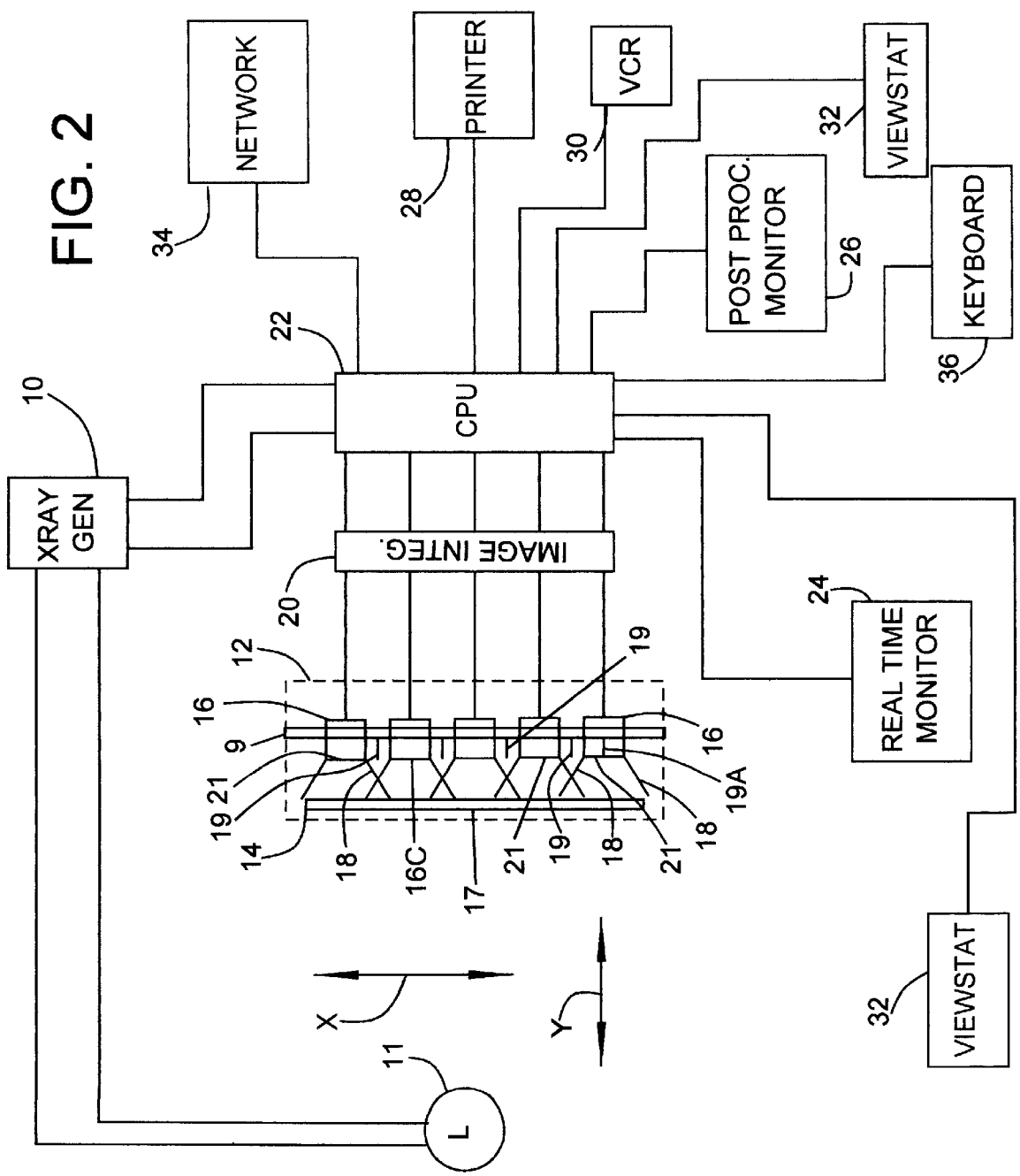

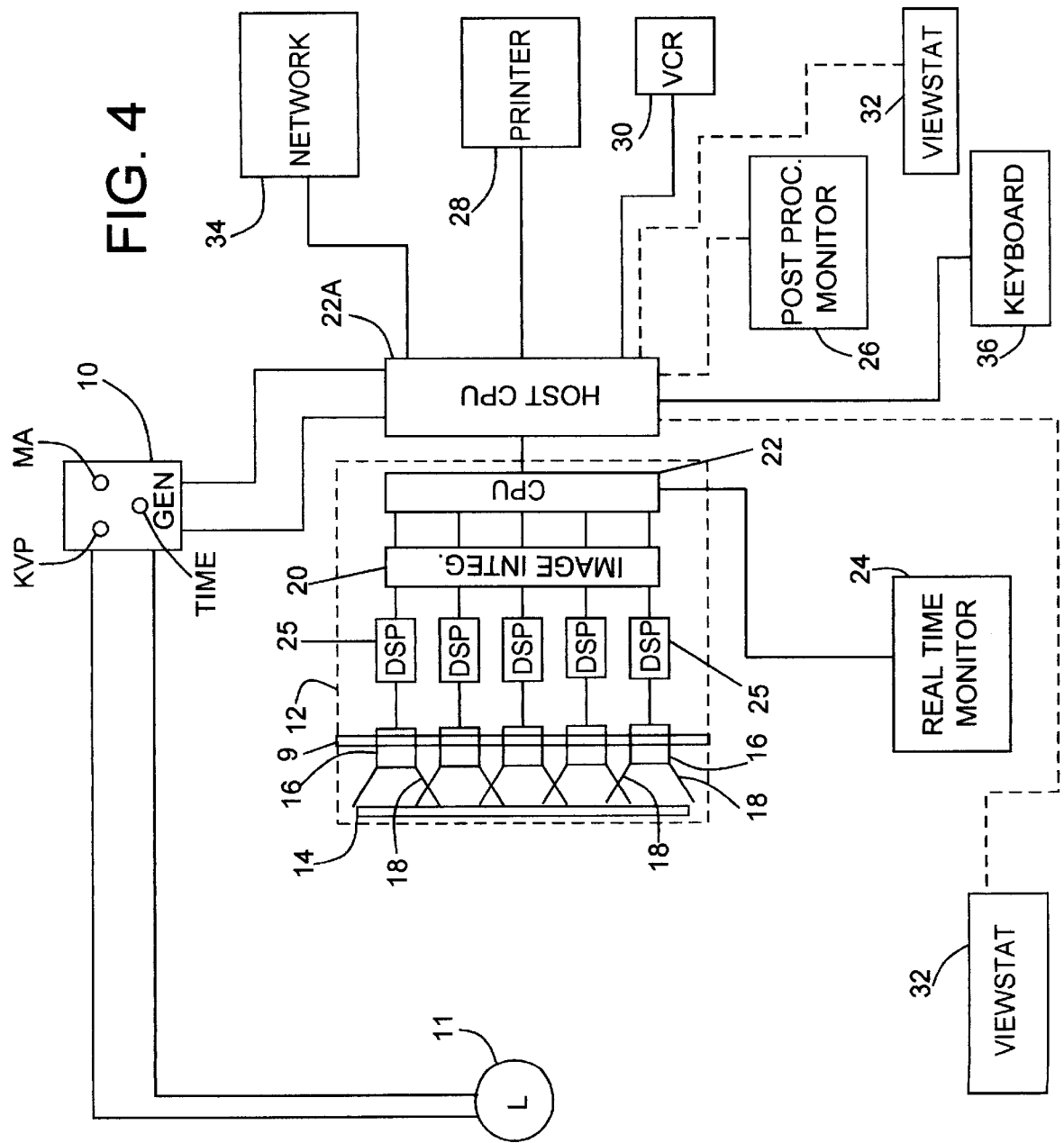

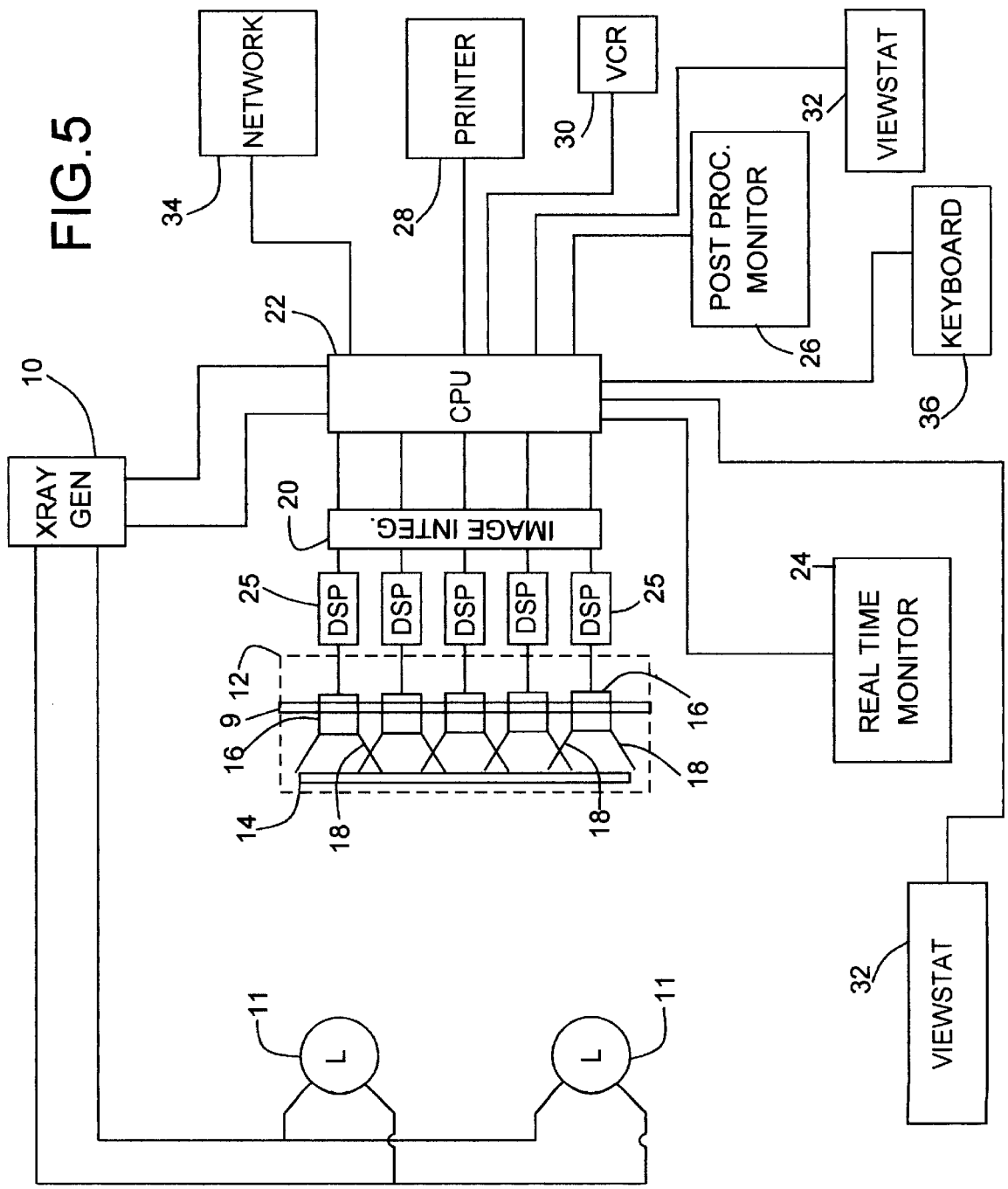

METHOD AND APPARATUS FOR IMAGE ACQUISITION FROM A PLURALITY OF CAMERAS

This invention claims the benefit of U.S. Provisional Applications Ser. No. 60/052,460, filed Jul. 14, 1997; and Ser. No. 60/021,904, filed Jul. 17, 1996 co-pending therewith, to the extent the law allows.

BACKGROUND OF THE INVENTION

1. Field of the Invention

With regard to the classification of art, this invention is believed to be found in the general class pertaining to image acquisition and more particularly to those subclasses pertaining to an apparatus for acquiring images by using multiple cameras.

2. Description of Related Art

The acquisition of images by using multiple cameras is known in the prior art. The use of multiples cameras for use in acquiring X-ray images is disclosed in U.S. Pat. No. 5,309,496, that issued to Winsor on May 3, 1994. The disclosure is very brief in regard to the operation of the second embodiment disclosing the use of multiple cameras. The disclosure by Winsor is limited to two rows of cameras, as shown in FIG. 5. This arrangement of cameras limits the size of image or maximum resolution that is attainable. The present invention discloses an apparatus and systems for providing real time imaging at high resolution in large formats. The present invention also allows image acquisition in low light condition.

SUMMARY OF THE INVENTION

The present invention may be summarized briefly with respect to its objects. It is an object of the present invention to provide and it does provide an imaging system that includes a mounting panel for multiple cameras that arrays the cameras in rows and columns so that at least one of the cameras is fully surrounded by adjacent cameras. The viewing areas of each camera overlap so that a central processing unit sews the images from each camera in a seamless and continuous form for viewing or storage.

It is another object of the present invention to provide and it does provide an imaging system using multiple cameras that are arrayed on a mounting panel in at least three rows and at least three columns for forming a redundant camera array.

It is yet another object of the present invention to provide and it does provide an apparatus for acquiring images by means of an array of multiple cameras. The apparatus also displaying those multiple images as a single seamless and continuous image in large formats and at high resolutions.

It is still yet another object of the present invention to provide and it does provide an apparatus and its related circuitry for increasing the sensitivity of the multiple cameras used in acquiring images at low light conditions.

It is a further object of the present invention to provide and it does provide an imaging system that may be used in acquiring images for scanning, photocopying, X-ray imaging and the like.

It is still yet a further object of the invention to provide and it does provide a modular camera panel that may be interconnected to other modular camera panels for producing an image receptor of unlimited size.

One embodiment of the present invention may be briefly described as: an apparatus for acquiring X Ray images under low light levels and at selected resolutions using multiple cameras or sources that includes: an image receptor, an image integrator, and a central processing unit. The image receptor includes a first panel, phosphorescent coated screen or plate; and a camera mounting panel. The first panel preferably is a lead glass plate that includes a polarizing coating for limiting the scattering of the visible light rays. A lead glass is preferred for minimizing damage to the cameras by X-rays. The multiple cameras are arrayed on the camera panel so that the viewing areas of each camera overlaps the view areas of each adjacent camera, leaving no voids in the viewing areas. The camera mounting panel may include integral electronic components and circuitry for connecting each or all of the cameras to the image integrator. The connection of the cameras to the image integrator preferably includes digital processing such as DSP and the like. The cameras may be selected from those image sensors of the CCD type, CMOS type, and the like. The image integrator and the central processing unit may provide control of an exposure time by the X-ray generator by means of phototimer circuitry. The phototimer circuitry allows each and every one of the multiple cameras to acquire a predetermined level of light. The exposure time is terminated after the phototimer circuitry determines that each and every camera has received the desired predetermined level of light. The image integrator and the central processing unit also provide circuitry and software for matching the level of input from each camera. The central processing unit simultaneously distinguishes between the images from each camera and subsequently saves or displays the image in a continuous and seamless form. The central processing unit is adapted to acquire images in 2D, 3D, true perspective or stereo. The central processing unit may also be adapted for feeding images or files to storage media and/or peripherals such as a real time monitor; a post process monitor, laser printer; a VCR; a network and the like. The central processing unit is also adapted for receiving operator commands or input from keyboards, datapanels and the like.

Another embodiment of the present invention includes the method of acquiring images from multiple cameras at low light levels and at predetermined resolutions. The method includes steps of: receiving X-rays from an X-ray tube on a phosphorescent coated plate or screen of an image receptor. Arraying a plurality of cameras on a side of the phosphorescent coated plate opposite the X-ray tube. Capturing the image from the phosphorescent coated plate by and with at least nine cameras. The cameras being arrayed so that a viewing area of each camera overlaps the view areas of each adjacent camera, leaving no voids in the viewing areas. At least one of the cameras is completely surrounded by adjacent cameras. Each camera capturing a predetermined portion of the image. Feeding the output signals from each camera to an image integrator. Feeding the output from the image integrator to a central processing unit. Sewing the predetermined portions of the image from each of the cameras into one continuous image by aligning the images in the central processing unit. Selectively distributing the continuous image to peripherals such as data storage; a real time monitor; a post process monitor and keyboard; laser printer; a VCR; a network and the like.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one embodiment in a preferred or best mode for a method and apparatus of the present invention. These specific embodiments, as shown in the accompanying drawings, may also include diagrammatic symbols for the purpose of illustration and understanding.

BRIEF DESCRIPTION OF THE DRAWING

FIG. 2 represents a schematic of first embodiment of the present invention for X-ray image acquisition at high resolutions using a plurality of cameras.

FIG. 4 represents a schematic of a second embodiment of the present invention for image acquisition at high resolution using a plurality of cameras.

FIG. 5 represents a schematic of a third embodiment of the present invention for 3D image acquisition using a plurality of cameras.

Figure 3:
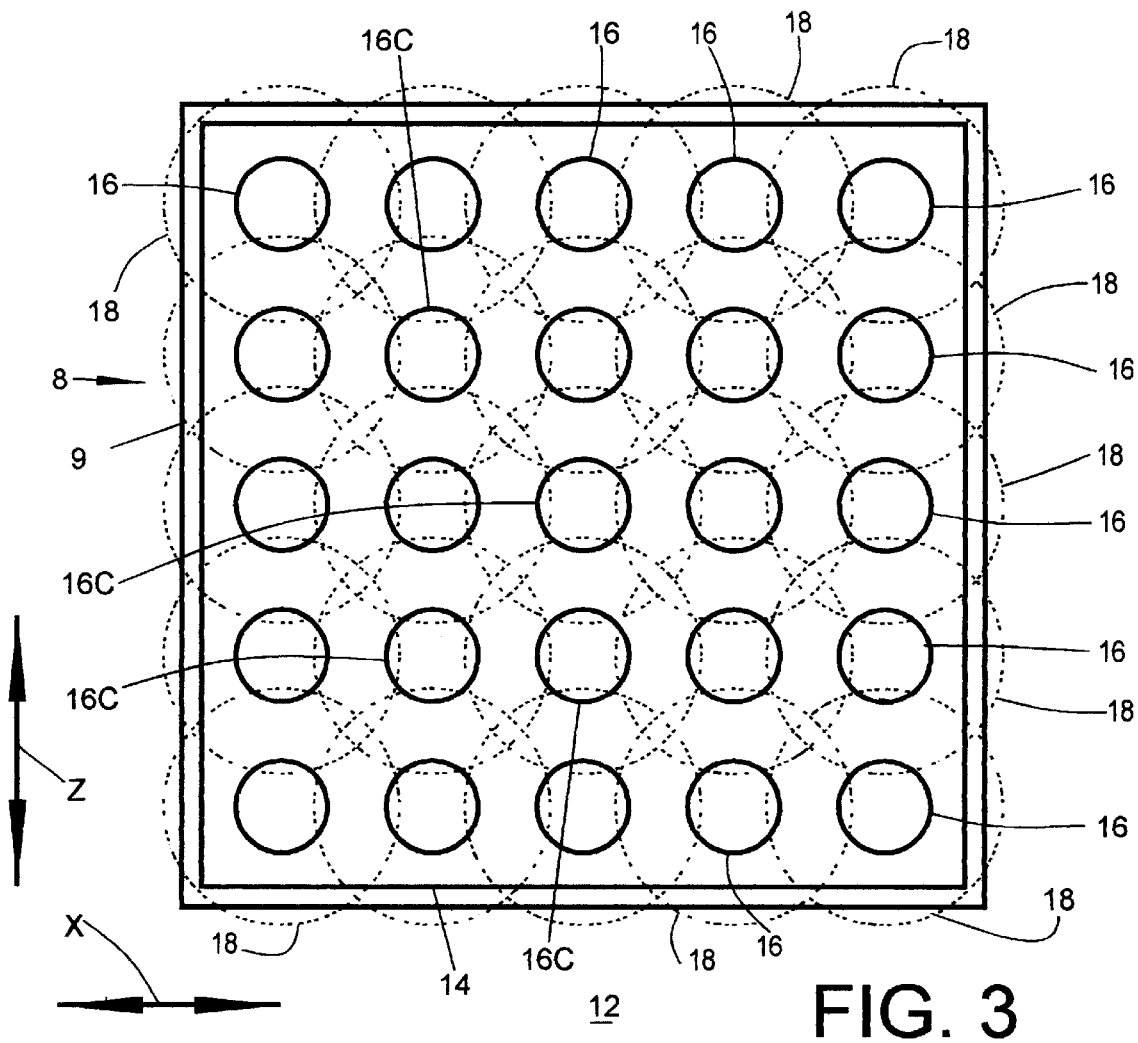
FIG. 3 represents a plan view of one type of an image receptor for the embodiments of the present invention, this view being partly schematic.

In the following description and in any appended claims, various details are identified by specific names for convenience. These names are intended to be generic in their application while differentiating between the various components. The corresponding reference numbers refer to like components throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Figure 1:
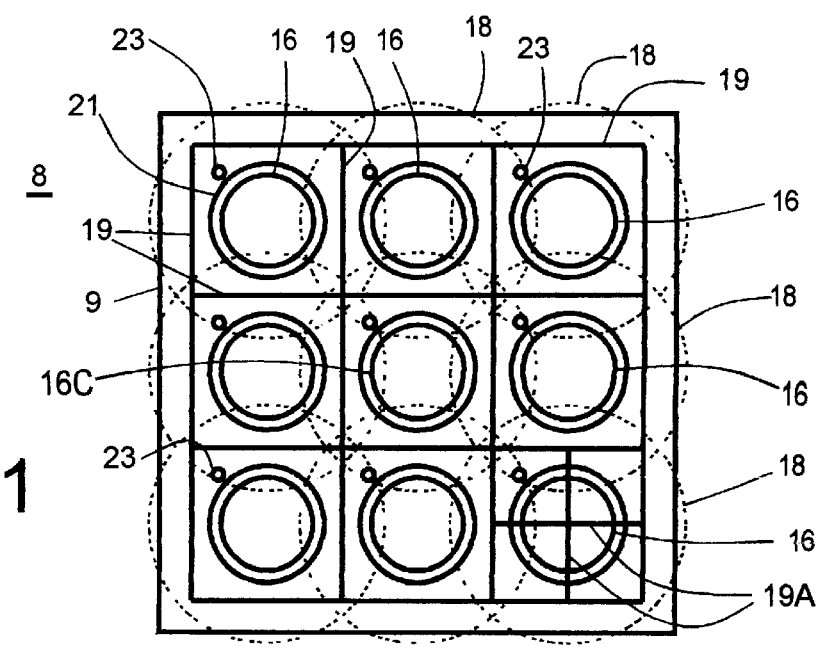
FIG. 1 represents a plan view of one embodiment of a camera panel of the present invention, this view showing a plurality of cameras or image sensors in a redundant camera array.
Figure 6:
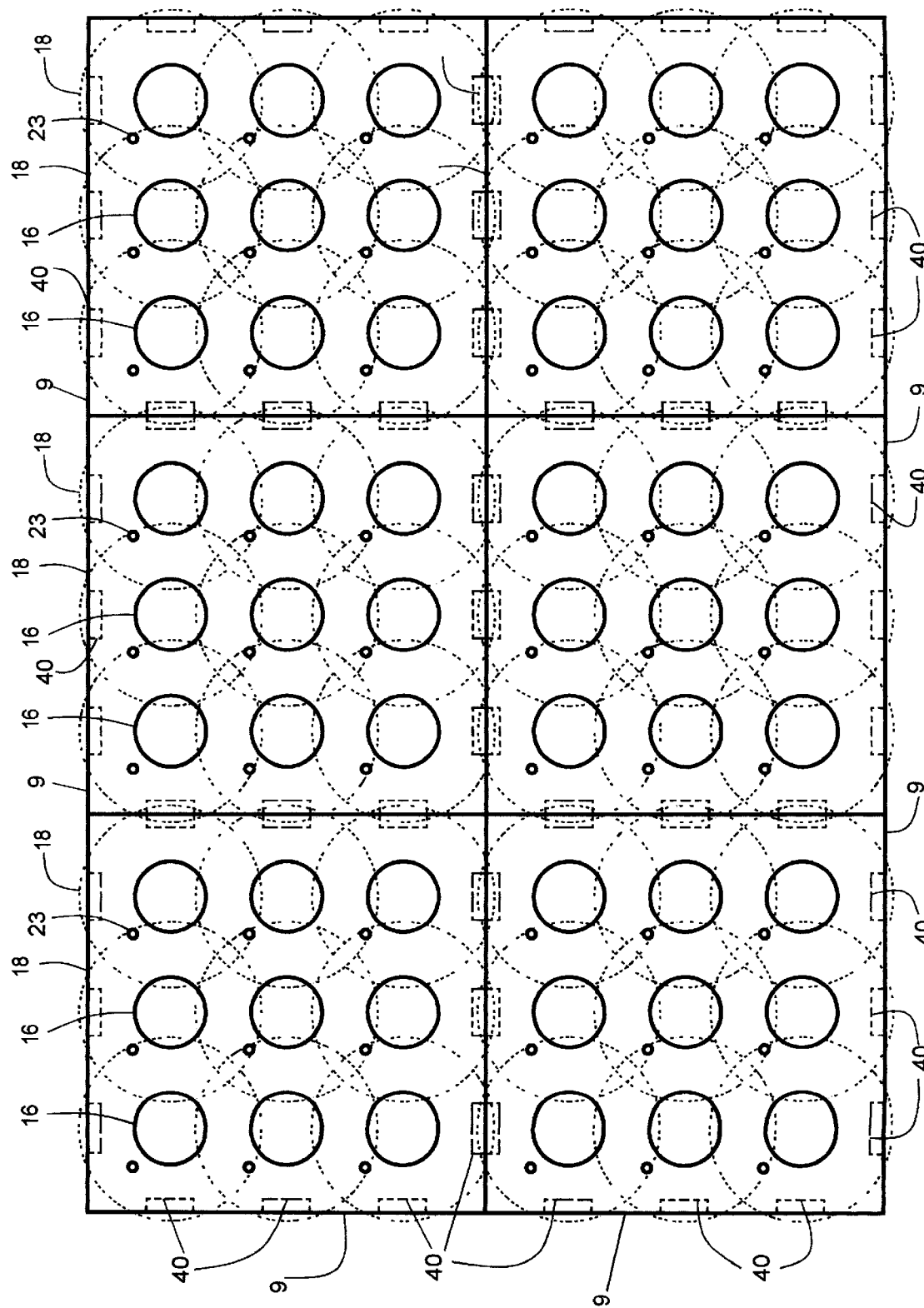
FIG. 6 represents a plurality of modular camera panels that are arrayed for interconnection in a tiled mode.

Referring first to FIG. 1, a redundant camera array 8 includes a camera mounting panel 9 that is adapted for mounting at least nine cameras 16 in a selected array of three rows and having three cameras in each row. This arrangement of the nine cameras 16 positions one of its cameras 16C in a more or less centered condition. All cameras 16 and 16C have geometrical viewing area 18 that is shown as a circle, but not limited thereto. Camera 16C is surrounded by the eight remaining cameras 16. The preferred spacing between all of the cameras 16 and 16C is such that the viewing area 18 of each camera overlaps the viewing area 18 of an adjacent camera at the image plane. There should be no voids resulting from the overlapping of the viewing area at the image plane. The resolution of the image acquisition is increased by adding more of the cameras 16 and 16C to the redundant panel array 8. The physical size of the panel is the only restriction to the quantity of cameras that can be arrayed thereon. The cameras 16 and/or 16C or image sensors may be of the CCD (charge-coupled device), CMOS (complementary metal oxide semiconductor), or the like.

Referring now to FIG. 2, a first embodiment of the present invention is depicted as part of an X-ray imaging apparatus. That first embodiment includes an X-ray generator, generally identified as 10. The X-ray generator 10 controls the operation of an X-ray tube 11. A subject or item to be X-rayed, is placed between the X-ray tube 11 and an image receptor or pick-up 12. The image receptor 12 includes a first panel, screen or lead glass plate 14, and a plurality of cameras 16 and 16C mounted on a camera panel 9. The screen 14 preferably includes a phosphorescent coating or properties, meaning that the screen or coated glass plate 14 glows when struck by X-rays from the X-ray tube 11 and emits light rays. It is preferred that the system be gridless for built in quantum noise reduction. It is preferred that the first panel 14 include at least one light directing means for minimizing the scattering of the light rays. This light directing means may include a coating means on the surface 17 and/or a first panel that has micro lenses formed therein and thereon. Some examples of a coating means include a polarizing coating, a thin film dielectric low pass filter coating and the like. One method of forming micro lenses is by way of x-ray lithography and the like but not limited thereto.

The cameras or sensors 16 and 16C are arrayed in a selected pattern on a mounting panel 9 and behind the screen 14, as depicted in FIGS. 2 and 3. The X ray tube 11 is located on the side of the screen 14 that is opposite to the cameras or sensors 16 and 16C. The X ray tube 11 or light source and/or the camera mounting panel 9 are usually mounted in a stationary array with respect to each other. Alternatively the light source 11 and/or the camera mounting panel 9 may be selectively moved with respect to each other in an X, Y and/or Z direction, by stepper motors and the like. The X, Y and Z directions are depicted by the arrows in FIGS. 2 and 3. The combinations of the directions of movement allows for movement in straight lines, arcs, or combinations thereof.

As mentioned above, the resolution of the image is controlled by the quantity and density of the placement of the cameras that are mounted behind the screen 14. This means that the more of the cameras or sensors that are used in a given area, the higher the resolution for the image. Each of the cameras 16 or 16C has a predetermined viewing area 18, that is depicted in dashed outline, as a circle. It is to be noted that other geometrical patterns for the viewing area 18 may be selected. Referring in particular to FIG. 2, the array of cameras or sensors must provide for the overlapping of the viewing areas 18. An image integrator 20 and a central processing unit 22 sews the image from each camera 16 into a continuous or seamless composite image that has very high resolution. This composite image may be viewed in real time by peripheral equipment that will be discussed later. Viewing and printing of the composite image may be operator selectable in portrait or landscape mode in standard X-ray formats. It is preferred that the image receptor 12 be interchangeable with existing X-ray equipment using the Bucky Design 1. This interchangebility may not be required on newly designed equipment, therefore larger formats may be desirable.

It is to be noted that the image integrator 20 and the central processing unit 22 are shown as discrete separate modules in FIGS. 2 and 5. However all electronics including the image integrator 20 and the central processing unit 22 may be integrally mounted on the image receptor PC board 12, as depicted in FIG. 4. This integral arrangement allows for communication between the image receptor board 12 or the host computer 22A and one or more of the peripherals by corded communication, shown as a solid line or wireless communication, shown as a dashed line.

As previously mentioned, it is preferred that the system be substantially gridless to minimize noise, but not limited thereto. A gridless system can be achieved by using a glass or composite filter between the plate 14 and the cameras 16 of the image receptor 12. This would further minimize the amount of unfocused light reaching the cameras 16. Alternatively, the unwanted noise can be filtered electronically, by dynamic frame integration or the like. This electronic frame integration may be coupled with motion detection to minimize blurred images. It is to be noted that noise filtration may include the use of a standard grid alone or in combination with composite filters and/or electronic filters. Another means of controlling the amount of light reaching each camera is to provide a plurality of partition means 19 between the lenses 21 and the cameras 16. The partition means 19 should be arrayed between each camera for limiting unwanted scattering of light from an adjacent lens. The partition means 19 is shown in FIG. 1 and 2 should be made of a thin material and have a matte black finish. It is to be noted that in a close coupled arrangement by the pens with the cameras, each individual cell formed by the partitions 19 may require further partitioning as depicted by interior partitions 19A that are also vertically arrayed between the sensor or camera and its associated lens or micro lenses.

Referring again in particular to FIG. 2, the image integrator 20 and the central processing unit 22 portion of the system preferably controls the phototiming of the X-ray generator 10. This means that each camera 16 provides an indication to the central processing unit 22 that it has received a predetermined amount of light from the X-ray generator 10. The time period of exposing the subject to the light from the X-ray tube 11 is terminated after each and every camera 16 has received the predetermined amount or level of light. One non-limiting example is as follows: resolutions of 16000×16000×16 Bit, may be easily acquired at a 43.6 cm×43.6 cm (17"×17") image receptor size. However the resolution is dependent on the number of pixels per sensor or camera 16 and the number of sensors 16 looking at the same object area. Therefore resolution or contrast may be increased by controlling the percentage of the overlapping of the multiple cameras or sensors 16 looking at all or a portion of the same object area. These enhancements would be used in addition to the alignment of the overlapping images by the various algorithms of the system. It is to be also noted, that the camera panel 9 of the present invention lends itself to a modular design that allows for custom sized image receptors by tiling the modular camera panels 9. This modular design will be briefly discussed below. The exposure time or phototiming may be controlled by a photo diode 23 that is mounted on a camera panel 9 with CCD sensors. If CMOS sensors are used, the exposure time control may be integrally coupled therewith. However it has been discovered that it is possible to eliminate the photo diode 23 by monitoring and measuring the current drawn by a CCD or group of CCDs during exposure to light. It is to be noted that the strength of variable current draw value may need to be amplified to produce a signal that is useable as a variable phototiming or exposure signal.

Referring now to FIG. 4, the second embodiment of the present invention includes direct DSP communication 25 between an individual sensor or groups of sensors 16 or 16C and the image integrator 20.

Referring to FIGS. 2, 4 and 5, the composite and seamless image in the central processing unit 22 may be selectively sent to storage media such as a hard disk, hard disk card, and the like and/or peripheral equipment such as a real time monitor 24; a post process monitor 26, laser printer 28; a VCR 30; a network 34 and the like. Input may be received from operator interactive devices such as a keyboard 36, a touch screen or Viewstat 32, or a datapanel and the like.

The operator may view the image in real time by incorporating a hard disk in the central processing unit. The real time mode allows the operator to also use the system for fluoroscopic acquisition. In the present invention the image receptor and the radiographic receptors will replace the image intensifier of a standard fluoroscope machine.

The systems' central processing unit 22 preferably includes software for producing images in color, gray scale, or black and white. It has also been found that the system of the present invention can accurately depict the various body tissues and bone densities in their actual color by and through a colorization process in the software. This colorization process includes: first, exposing the patient to high KVP (kilovolts peak) then recording the results. Second, exposing the patient to a low KVP then recording the results. The different reactions of the bone, tissue, ligaments and the like to the two levels of KVP allows for distinguishing therebetween and subsequently providing the accurate colorization thereof. This process may be supplemented with look up tables of known anatomical models for assisting in the accurate colorization. This system for the colorization process preferably includes at least one variable exposure means for selective control of the exposure values. The variable exposure means includes one or more controls for setting the levels of the KV (kilovolts); the MA (miliamperes) and the Time on the X ray control 10, shown in FIG. 4.

Referring in particular to FIG. 5, the third embodiment of the present invention may be used for acquiring 3D images from two light sources 11. This third embodiment preferably also includes the ability to acquire and display the images in a tomographic mode. The tomographic mode is capable of viewing the image in modes such as 3D, stereo or the like. It may be necessary to view some of the 3D images with 3D glasses or spectacles.

Alternatively, the central processing unit of FIGS. 2 and 4 may include a propagating and vectoring algorithm for providing 3D images from a single light source or multiple light sources. The system of the present invention also lends itself for producing laser generated 2D and 3D holograms through computer drivers.

Referring again to FIGS. 2, 4, and 5, the present invention is believed to provide the highest resolutions for X-ray images without the need of traditional X-ray film/cassettes. This is particularly true for the in-room viewing of the real time monitor 24 by a technician or radiologist. The central processing unit 22 may be able to accommodate as many as 4 image receptors as well as 2 monitors. The system may be networked to additional X-ray rooms or Patient Archive Computer System (PACS).

The embodiments of the present invention may include on board camera binning of the pixels of the cameras or sensors 16. However binning may be done at the camera or in the software for the system. Binning is used for exponentially increasing sensitivity of the cameras 16 and 16C.

The system of the present invention must first be calibrated. The system may be self calibrating or manually calibrated. One example of manual calibration of the system may include the steps of the calibrating of each camera by first placing a geometric test pattern in front of the camera array. Each camera is aligned to the sub-pixel level using the geometric test pattern. After removing the geometric test pattern, a gray scale test pattern is placed in front of the camera array. The camera array is exposed with light energy or X-ray energy with the gray scale test pattern in place. The software program compensates for any differences in gray scale, and subsequently loads these corrections into system memory. Alternatively the calibration of the system may be made by and with a single test pattern.

It is anticipated that the redundant camera array of the present invention may be used in fields other than medical diagnosis by X-rays. These fields may include image scanning, photography, telescopes, microscopes, industrial vision, industrial X-ray, security, commercial applications and the like. The 3D capability of the system of the present invention allows its use in connection with medical or commercial procedures that require the accurate positioning of a tool or an instrument.

Referring now to FIG. 7, the camera panel 9 of the present invention lends itself to being made in a modular fashion for interconnection with any number of other modular camera panels 9 for producing a scaleable array of unlimited size. Each modular camera panel 9 would include at least one mating portion of an edge connector assembly 40 that allows the interconnection of image receptors or camera panels 9 in a tiled array.

Directional terms such as "front", "back", "behind", "in", "out", "downward", "upper", "lower" "vertical" and the like may have been used in the description. These terms are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. An apparatus for acquiring images at selected resolutions using multiple cameras that includes:
   a) at least one source of light, an image receptor, an image integrator, and a central processing unit;
   b) the image receptor including a camera mounting panel, the camera mounting panel including integral electronic components and circuitry for providing any of a plurality of cameras mounted thereon and thereto with direct communication with the image integrator, each camera having a geometrical viewing area, the camera panel being arrayed for providing at least one of the cameras with adjacent cameras along all edges of its geometrical viewing area, the camera panel being further arrayed for providing an overlapping of the geometrical viewing area of the at least one camera with the viewing area any camera adjacent thereto absent any voids;
   c) the image integrator and the central processing unit further providing circuitry and software for matching the level of input from each camera;
   d) a calibrating means arrayed for aligning the sub-pixel level of each camera and compensating for differences in gray scale level of each camera; and
   wherein the central processing unit simultaneously distinguishing between images from the viewing area of each camera and subsequently integrates the image into a continuous seamless form.

2. An apparatus as recited in claim 1 wherein each light source is arrayed for emitting X-rays and said apparatus further includes a first panel having phosphorescent properties for converting the X-rays to light rays.

3. An apparatus as recited in claim 2 wherein said first panel is a lead glass for minimizing damage to electronic components of the image receptor that are sensitive to X-rays.

4. An apparatus for acquiring images at selected resolutions using multiple cameras that includes:
   a) at least one source of light, an image receptor, an image integrator, and a central processing unit;
   b) the image receptor including a camera mounting panel, the camera mounting panel including integral electronic components and circuitry for providing any of a plurality of cameras mounted thereon and thereto with direct communication with the image integrator, each camera having a geometrical viewing area, the camera panel being arrayed for providing at least one of the cameras with adjacent cameras along all edges of its geometrical viewing area, the camera panel being further arrayed for providing an overlapping of the geometrical viewing area of the at least one camera with the viewing area any camera adjacent thereto absent any voids the camera panel further includes a partition means that is selectively arrayed between at least one lens and its associated camera for limiting the unwanted scattering of light from an adjacent lens;
   c) the image integrator and the central processing unit further providing circuitry and software for matching the level of input from each camera; and
   wherein the central processing unit simultaneously distinguishing between images from the viewing area of each camera and subsequently integrates the image into a continuous seamless form.

5. An apparatus for acquiring images at selected resolutions using multiple cameras that includes:
   a) at least one source of light, an image receptor, an image integrator, and a central processing unit;
   b) the image receptor including a camera mounting panel, the camera mounting panel including integral electronic components and circuitry for providing any of a plurality of cameras mounted thereon and thereto with direct communication with the image integrator, each camera having a geometrical viewing area, the camera panel being arrayed for providing at least one of the cameras with adjacent cameras along all edges of its geometrical viewing area, the camera panel being further arrayed for providing an overlapping of the geometrical viewing area of the at least one camera with the viewing area any camera adjacent thereto absent any voids;
   c) the image integrator and the central processing unit further providing circuitry and software for matching the level of input from each camera; and
   wherein the central processing unit simultaneously distinguishing between images from the viewing area of each camera and subsequently integrates the image into a continuous seamless form and the image receptor, the image integrator and the central processing unit are integrally mounted on at least one image receptor PC board, and each image receptor PC board is adapted for allowing a wireless communication between it and at least one peripheral.

6. An apparatus for acquiring images at selected resolutions using multiple cameras that includes:
   a) at least one source of light, an image receptor, an image integrator, and a central processing unit;
   b) each light source being arrayed for emitting X-rays;
   c) the image receptor including a camera mounting panel, the camera mounting panel including integral electronic components and circuitry for providing any of a plurality of cameras mounted thereon and thereto with direct communication with the image integrator, each camera having a geometrical viewing area, the camera panel being arrayed for providing at least one of the cameras with adjacent cameras along all edges of its geometrical viewing area, the camera panel being further arrayed for providing an overlapping of the geometrical viewing area of the at least one camera with the viewing area any camera adjacent thereto absent any voids, said image receptor further including a first panel being positioned between said camera mounting panel and each light source, said first panel having phosphorescent properties for converting the X-rays to light rays, a selected surface of said first panel having at least one light directing means for limiting the scattering of the light rays passing therethrough towards the cameras;

d) the image integrator and the central processing unit further providing circuitry and software for matching the level of input from each camera; and wherein the central processing unit simultaneously distinguishing between images from the viewing area of each camera and subsequently integrates the image into a continuous seamless form.

7. An apparatus for acquiring images at selected resolutions using multiple cameras that includes:

a) at least one source of light, an image receptor, an image integrator, and a central processing unit;

b) the image receptor including a camera mounting panel, the camera mounting panel including integral electronic components and circuitry for providing any of a plurality of cameras mounted thereon and thereto with direct communication with the image integrator, each camera being of a complimentary metal oxide semiconductor type and having a geometrical viewing area, the camera panel being arrayed for providing at least one of the cameras with adjacent cameras along all edges of its geometrical viewing area, the camera panel being further arrayed for providing an overlapping of the geometrical viewing area of the at least one camera with the viewing area any camera adjacent thereto absent any voids;

c) the image integrator and the central processing unit further providing circuitry and software for matching the level of input from each camera; and wherein the central processing unit simultaneously distinguishing between images from the viewing area of each camera and subsequently integrates the image into a continuous seamless form.

8. An apparatus as recited in claim 7 which further includes a phototimer for allowing each and every one of the cameras to acquire a predetermined level of light, the exposure time being terminated after the phototimer circuit determines that each and every camera has received the desired predetermined level of light.

9. An apparatus as recited in claim 5 which further includes a calibrating means arrayed for aligning the sub-pixel level of each camera and compensating for differences in gray scale level of each camera.

10. An apparatus as recited in claim 6 which further includes a calibrating means arrayed for aligning the sub-pixel level of each camera and compensating for differences in gray scale level of each camera.

11. An apparatus as recited in claim 1 wherein the direct communication between each camera and the image integrator employs DSP technology.

12. An apparatus as recited in claim 2 wherein the direct communication between each camera and the image integrator employs DSP technology.

13. An apparatus as recited in claim 3 wherein the direct communication between each camera and the image integrator employs DSP technology.

14. An apparatus as recited in claim 9 wherein the direct communication between each camera and the image integrator employs DSP technology.

15. An apparatus as recited in claim 11 which further includes a real time hard drive in the central processing unit for providing real time processing of the captured images.

16. An apparatus as recited in claim 12 which further includes a real time hard drive in the central processing unit for providing real time processing of the captured images.

17. An apparatus as recited in claim 13 which further includes a real time hard drive in the central processing unit for providing real time processing of the captured images.

18. An apparatus as recited in claim 14 which further includes a real time hard drive in the central processing unit for providing real time processing of the captured images.

19. An apparatus as recited in claim 1 which employs at least two of the sources of light that are selectively spaced for providing a three dimensional image of a subject.

20. An apparatus as recited in claim 3 which employs at least two of the sources of light that are selectively spaced for providing a three dimensional image of a subject.

21. An apparatus as recited in claim 20 wherein the three dimensional image may be selectively viewed by a viewer wearing special spectacles.

22. An apparatus as recited in claim 1 wherein said apparatus employs binning of the image data for increasing a sensitivity of the cameras for use in low light conditions.

23. An apparatus as recited in claim 2 wherein the first panel further includes at least one light directing means provided on a selected surface of the first panel for limiting the scattering of the light rays.

24. An apparatus as recited in claim 3 wherein the first panel further includes at least one light directing means provided on a selected surface of the first panel for limiting the scattering of the light rays.

25. An apparatus as recited in claim 1 wherein the central processing unit includes a propagating and vectoring algorithm for providing 3D images from a single light source.

26. An apparatus as recited in claim 2 wherein the central processing unit includes a propagating and vectoring algorithm for providing 3D images from a single light source.

27. An apparatus as recited in claim 3 wherein the central processing unit includes a propagating and vectoring algorithm for providing 3D images from a single light source.

28. An apparatus as recited in claim 1 which further includes a phototimer for allowing each and every one of the cameras to acquire a predetermined level of light, the exposure time being terminated after the phototimer circuit determines that each and every camera has received the desired predetermined level of light.

29. An apparatus as recited in claim 2 which further includes a phototimer for allowing each and every one of the cameras to acquire a predetermined level of light, the exposure time being terminated after the phototimer circuit determines that each and every camera has received the desired predetermined level of light.

30. An apparatus as recited in claim 3 which further includes a phototimer for allowing each and every one of the cameras to acquire a predetermined level of light, the exposure time being terminated after the phototimer circuit determines that each and every camera has received the desired predetermined level of light.

31. An apparatus as recited in claim 28 wherein the phototimer is a photo diode.

32. An apparatus as recited in claim 29 wherein the phototimer is a photo diode.

33. An apparatus as recited in claim 30 wherein the phototimer is a photo diode.

34. An apparatus as recited in claim 2 wherein the central processing unit further includes software for converting a gray scale image into a colorized image.

35. An apparatus as recited in claim 3 wherein the central processing unit further includes software for converting a gray scale image into a colorized image.

36. An apparatus as recited in claim 34 which further includes a variable exposure means for providing gray scale data for use in colorizing the colorized image.

37. An apparatus as recited in claim 35 which further includes a variable exposure means for providing gray scale data for use in colorizing the colorized image.

38. An apparatus as recited in claim 35 which further includes a variable exposure means for providing gray scale data for use in colorizing the colorized image.

39. An apparatus as recited in claim 1 wherein the central processing unit further includes software for providing pattern recognition of tissues and bones.

40. An apparatus as recited in claim 2 wherein the central processing unit further includes software for providing pattern recognition of tissue and bones.

41. An apparatus as recited in claim 34 wherein the software further provides pattern recognition of tissues and bones.

42. An apparatus as recited in claim 1 wherein the camera panel further includes a partition means that is selectively arrayed between at least one lens and its associated camera for limiting the unwanted scattering of light from an adjacent lens.

43. An apparatus as recited in claim 1 wherein the image receptor, the image integrator and the central processing unit are intergrally mounted on at least one image receptor PC board, and each image receptor PC board is adapted for allowing a wireless communication between it and at least one peripheral.

* * * * *